Aug. 11, 1964          J. F. WELLEKENS          3,143,875
                            LOCKS
Filed Jan. 28, 1963                         4 Sheets-Sheet 1

INVENTOR.
John F. Wellekens
BY *Harry Radzinsky*
*Attorney*

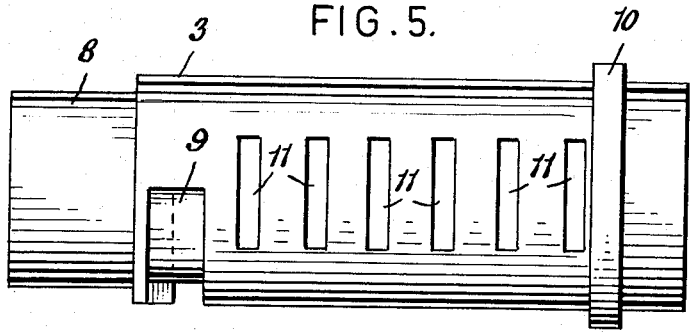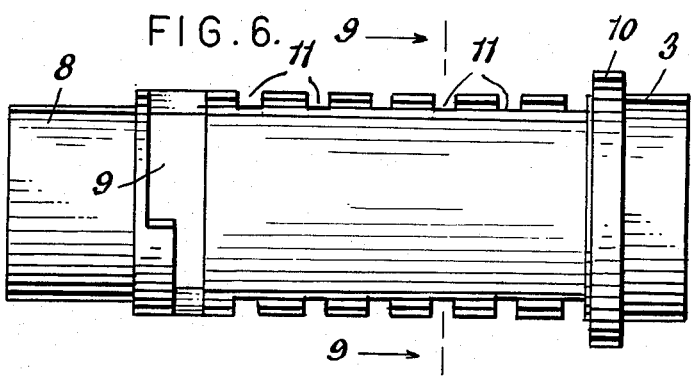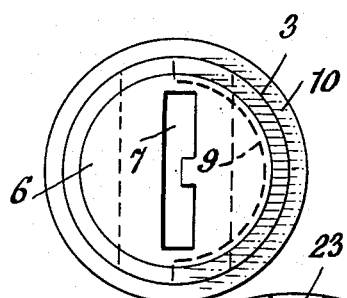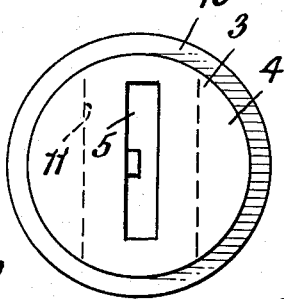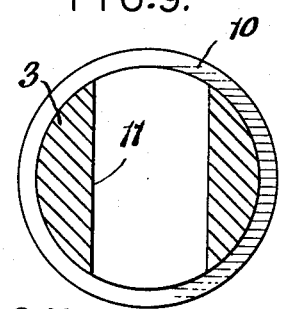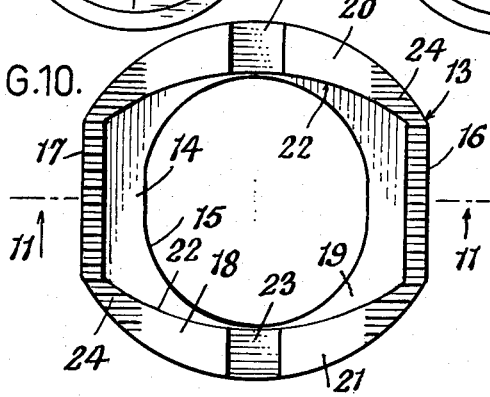
INVENTOR.
John F. Wellekens Aug. 11, 1964 J. F. WELLEKENS 3,143,875
LOCKS
Filed Jan. 28, 1963 4 Sheets-Sheet 3
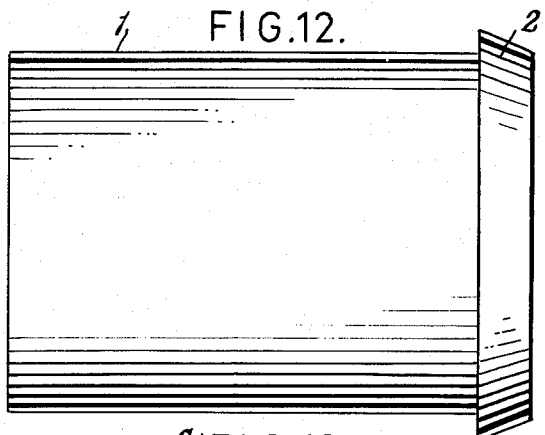
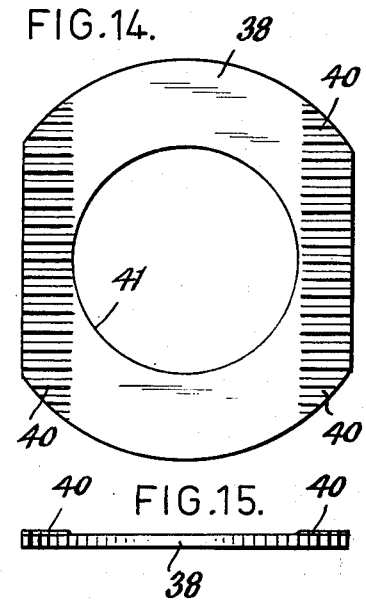
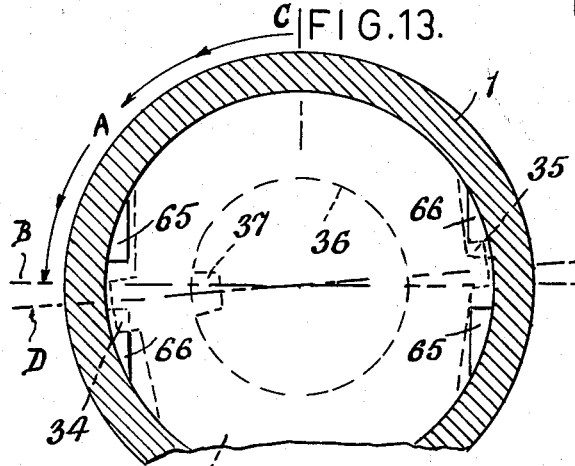
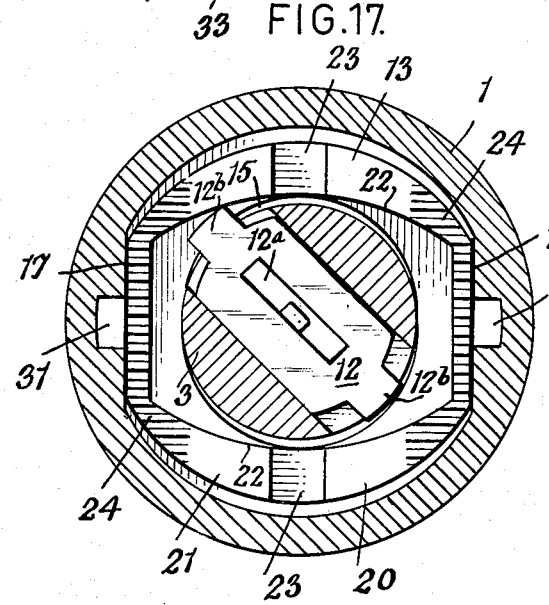
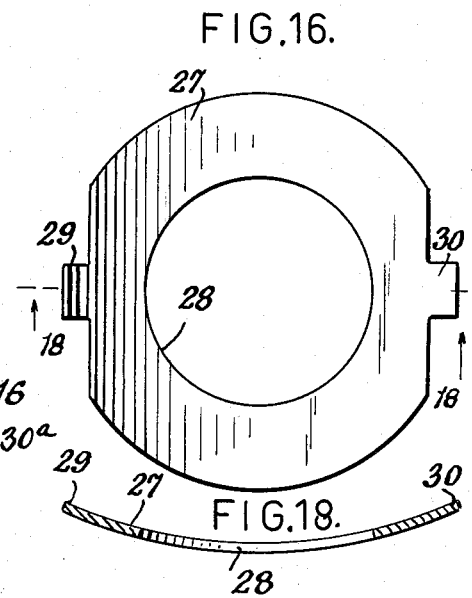
INVENTOR.
John F. Wellekens
BY Harry Razinsky
Attorney Aug. 11, 1964  J. F. WELLEKENS  3,143,875
LOCKS
Filed Jan. 28, 1963  4 Sheets-Sheet 4
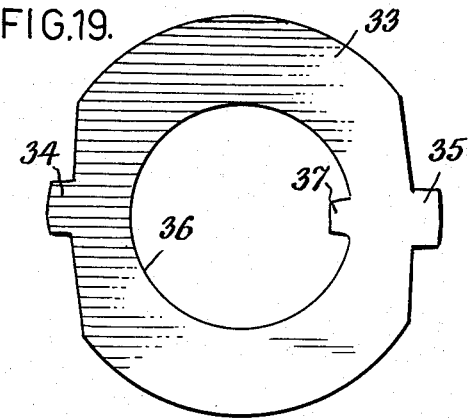
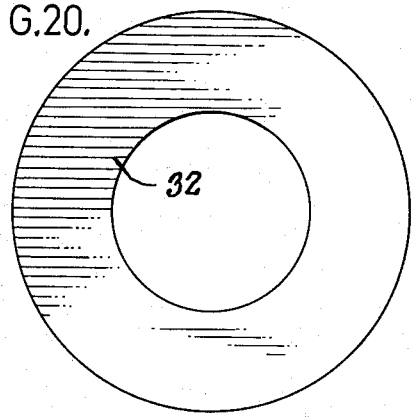
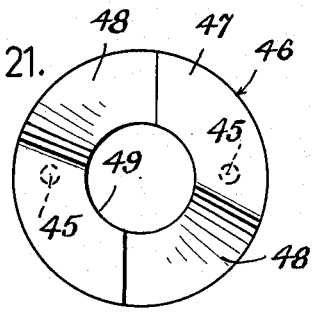
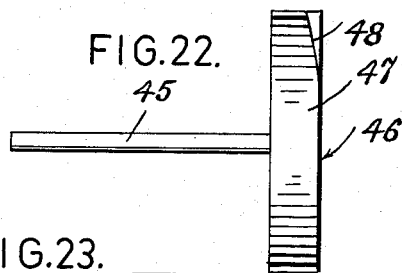
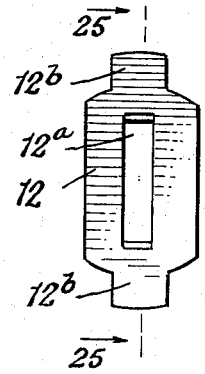
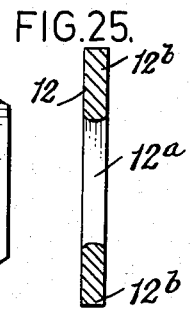
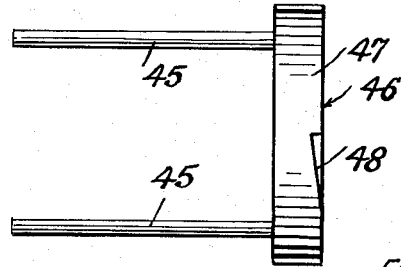
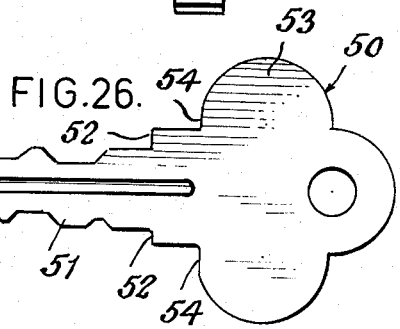
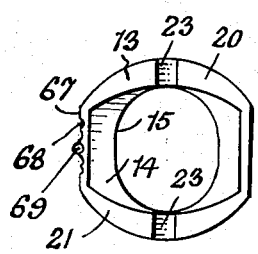
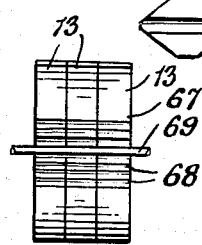
INVENTOR.
John F. Wellekens
BY Harry Radzinsky
Attorney United States Patent Office 3,143,875
Patented Aug. 11, 1964

3,143,875
LOCKS
John F. Wellekens, New York, N.Y., assignor to Hotel Security Systems Corporation, New York, N.Y., a corporation of New York
Filed Jan. 28, 1963, Ser. No. 254,104
9 Claims. (Cl. 70—382)

This invention relates to locks, and more particularly to the type shown in my Patent No. 2,960,466 dated Feb. 7, 1961, and in my co-pending application Serial No. 104,-588, filed Apr. 21, 1961, now Patent No. 3,130,572, and adapted for use on doors of hotel and motel rooms, on post office boxes, safes or other places where a change of occupancy or use often takes place or where it is desirable for the keying mechanism or the combination of a lock to be either occasionally or often changed.

It is well known that occupants of hotel rooms often carry off the key of the room occupied by them, and while such practice is usually due to absent-mindedness on the part of the hotel guest, there are instances where the key will be deliberately appropriated by a thief with the intention of subsequently returning to the room for the purpose of pilfering the property of the then occupant.

The present invention contemplates the provision of a lock which can have its keying mechanism or combination quickly changed to fit any one of a large number of differently-contoured keys by the simple insertion of a tool of special design in a part of the lock, and the insertion and turning of the new key to which the keying mechanism is to be adjusted to cause the lock to thereafter respond to the new key. The simple adjustment of buttresses within the lock by the use of the above tool and the turning of the new key in the lock, then results in the lock being adapted for operation by the new key, and until the combination is again changed by the use of the above-described tool, and the insertion of a new key, the combination will remain as set and the key for which the lock was adjusted will be effective to repeatedly open the lock.

It is an object of the invention to provide a lock having a combination-changing mechanism which can be readily fitted to prevailing door locks; which can be fitted in the knobs of doors in the manner of some known locks; which will be so constructed as to enable it to be adjusted at any time for the reception of a new key by the use of a simple tool.

With these and other objects to be hereinafter set forth in view, I have devised the arrangement of parts to be described and more particularly pointed out in the claims appended hereto.

In the accompanying drawings, wherein an illustrative embodiment of the invention is disclosed, FIG. 1 is a longitudinal sectional view through a lock construction made according to the invention;

FIG. 5 is a top plan view of the rotative plug or latch-actuating element of the lock;

FIG. 6 is a view of the plug taken at right angles to the view in FIG. 5;

FIG. 7 is an end view of the plug as seen from the left of FIG. 6;

FIG. 8 is an end view of the plug as seen from the right of FIG. 6;

FIG. 9 is a sectional view, taken substantially on the line 9—9 of FIG. 6, looking in the direction of the arrows;

FIG. 10 is a face view of one of the buttresses or stops as seen from the concave side of the same;

FIG. 11 is a sectional view, taken substantially on the line 11—11 of FIG. 10, looking in the direction of the arrows;

FIG. 12 is a side elevational view of the cylindrical lock housing;

FIG. 13 is a diagrammatic view, illustrating the action of the spring-pressure plate;

FIG. 14 is a face view of the serrated washer disposed against the group of buttresses;

FIG. 15 is an edge view of the serrated washer of FIG. 14;

FIG. 16 is a face view of the main or clamping spring for the buttresses;

FIG. 17 is a sectional view, taken substantially on the line 17—17 of FIG. 1, looking in the direction of the arrows;

FIG. 18 is a sectional view, taken substantially on the line 18—18 of FIG. 16, looking in the direction of the arrows;

FIG. 19 is a face view of the throw washer;

FIG. 20 is a face view of the annular plate for closing the rear end of the lock housing;

FIG. 21 is an end view of the tool employed for effecting a change of key;

FIG. 22 is a side elevation of said tool;

FIG. 23 is a top plan view of the above tool;

FIG. 24 is a face view of one of the wafer-type tumblers;

FIG. 25 is a sectional view, taken substantially on the line 25—25 of FIG. 24, looking in the direction of the arrows;

FIG. 26 shows the type of key employed in this embodiment of the lock;

FIG. 27 is a face view of a modified buttress, and

FIG. 28 shows a number of the buttresses of FIG. 27, arranged together and engaged by a holding rod.

Figure 1:
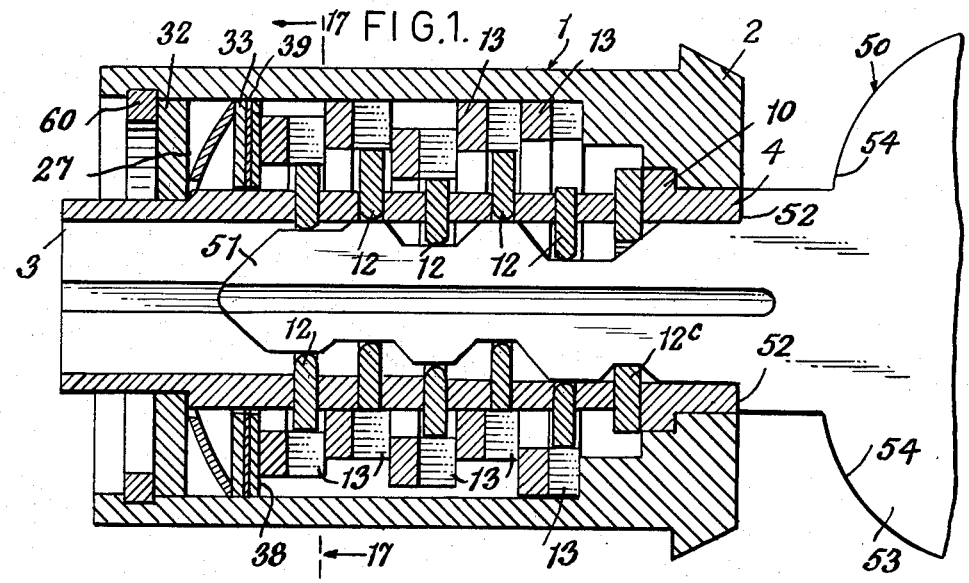

Referring to the drawings, 1 indicates generally the housing or casing of the lock. The same, as shown, is of cylindrical formation and is provided at its forward or front end with the annular flange 2.

Mounted for rotational movement within the housing 1 is a plug 3, the form and construction of which is disclosed in FIGS. 5 and 6. Said plug constitutes the latch-actuating element of the lock and by its rotational movements, controlled by a key, will advance or retract the latch or bolt of the lock in the known manner. The plug 3 is of cylindrical form and is closed at its forward end by a wall 4 provided with a key-hole 5. The plug may also be closed at its rear end by a closure plate 6 (FIG. 7) which plate is omitted from the sectional views of FIGS. 1 and 2. The plate 6 is provided with the key-hole shown at 7.

The plug is reduced in diameter adjacent to its rear end, as shown at 8, and formed in the plug adjacent to the beginning of its reduced-diameter part 8, is an arcuate slot 9, the purpose of which will be later explained. Near its opposite end, the plug is provided with an annular flange 10, and formed through the plug is a plurality of transversely-extending slots 11, six of which are shown in this embodiment. The wafer-type tumblers of the lock, shown at 12 in FIGS. 24 and 25, are slidably adjustable through the slots 11 as clearly shown in FIG. 17. Each of the wafer-type tumblers 12 is provided with a key passage 12a and with a lug 12b at its opposite ends.

Extending around or embracing the plug 3, it is plurality of adjustable cup-shaped buttresses or stops 13, the construction of which will be apparent from FIGS. 10 and 11. Each of said buttresses or stops includes a base portion or floor 14 provided with a substantially ovate opening 15 through which the plug 3 extends and within which the plug is rotative. The buttresses are externally non-round and are flattened at diametrically opposite locations as shown at 16 and 17, the external shape of each of the buttresses conforming to the interior shape of the portion of the housing 1 within which the buttresses are adjustable transversely of the housing and non-rotatively confined therein. Each buttress has a peripheral wall 18 defining an oval recess 19 with cut-off ends. The curved wall sections 20 and 21 each has a cam surface 22 against which the ends of the lugs 12b of the tumblers 12 are operative to shift the buttresses as required for the adjustment of the buttresses to cause the lock to accommodate the new key.

Each of the buttresses 13 is provided with diametrically-opposite recesses 23 into which the end parts 12b of the tumblers can be moved to lock the plug against rotation, and the face of the peripheral wall of each of the buttresses is roughened or serrated as shown at 24. The rear face of each buttress is also serrated as shown at 26. The purpose of these serrations at the locations just mentioned is to provide interengaging contact between the several buttresses to an extent to prevent relative shifting movement of the buttresses with respect to one another after they have been positioned for the accommodation of a key. They are held in the required position of adjustment by a curved clamping spring 27, shown in FIGS. 16 and 18. Said spring is formed with a central aperture 28 permitting it to encircle the plug 3, and it is provided with a pair of laterally-projecting lugs 29 and 30 which are normally disposed in a pair of longitudinal grooves 30a and 31 provided at diametrically-opposite points in the inner surface of the housing 1. The spring 27 is confined between a closure plate 32 (FIG. 20) located near one end of the housing and a flat pressure plate 33 constructed as shown in FIG. 19. Behind the pressure plate is located a split retaining ring 60 retained in an internal groove in the housing. It will be noted that the pressure plate 33 is provided with laterally-extending lugs 34 and 35 and with a central opening 36 and a release lug 37 disposed in said opening. The release lug 37 is disposed within the groove 9 of the plug and which groove is effective at the required time to cause a relief of pressure on the spring so that said spring will, upon such relief of pressure, apply the necessary force upon the buttresses to thereby clampingly hold the same together in the required positions for the accommodation of a specific key.

Figure 2:
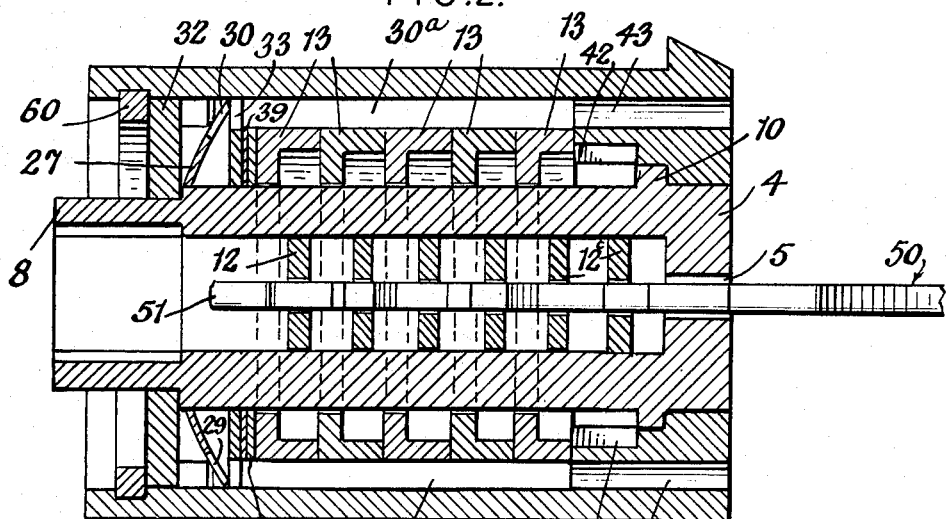
FIG. 2 is another sectional view through the lock, with the section being taken at right angles to that of FIG. 1.
Figures 3, 4:
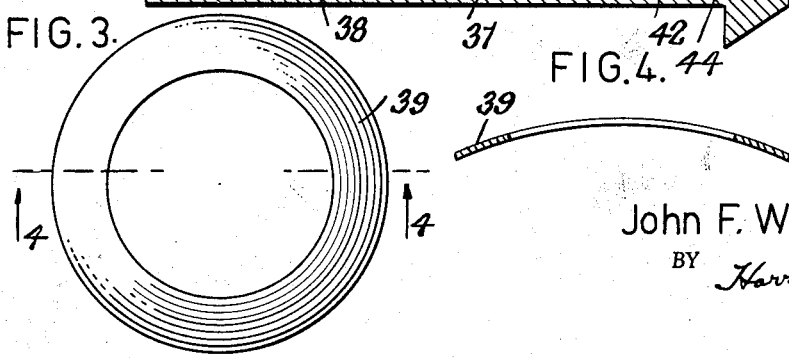
FIG. 3 is a face view of a secondary or holding spring.
FIG. 4 is a sectional view, taken substantially on the line 4—4 of FIG. 3, looking in the direction of the arrows.

Interposed between one end of the group of buttresses 13 and the pressure plate 33 is an annulus 38 (FIG. 14) to which is spot-welded a cup-shaped spring 39 (FIGS. 3 and 4), said spring 39 being a supplemental or holding spring effective to hold the buttresses lightly together and particularly during the relief of pressure on them by the spring 27. The annulus 38, which encircles the plug 3, by means of the central opening 41, is provided on one of its faces with the serrated areas 40, which contact with the serrated surface 25 on the rear buttress 13 at the left in FIGS. 1 and 2. One of the tumblers, or that shown at 12c in FIGS. 1 and 2, is the key-holding tumbler and grooves 42 are provided in the housing 1 to permit the required sliding movement of this particular tumbler.

Communicating with the grooves 30a and 31 are passages 43 and 44 (FIG. 2) which open at the front of the lock housing and into which a pair of rods or prongs 45 (FIGS. 22 and 23) provided on a tool generally indicated at 46 may be inserted. Said tool constitutes an element employed when a change of key is to be made, and it includes an annular head 47 that is provided on its outer face with two inclined cam surfaces 48. The rods or prongs 45 extend in parallelism from the opposite side of the head and the head is provided with a central opening 49 through which a key is inserted to enter the plug and used in a manner to be presently described.

A key of the type used in connection with the lock, is shown at 50, the same having the conventional notched and grooved shank 51 integrally formed with the head 53. The key is formed with shoulders 52 limiting the extent of insertion of the shank into the lock and one end of the head 53 defines the shoulders 54 which are operative against the cam surfaces 48 on the tool 46 to increase the depth of penetartion of the rods 45 into the lock through the grooves 30a and 31 to thereby cause said rods to exert pressure on the plate 33 to compress the spring 27 to an extent to relieve the pressure of said spring upon the buttresses 13 and allow the buttresses to be shifted to accommodate them and the tumblers to the contour of a new key.

Assuming that the lock is set for a specific key and it is desired to adapt the lock to a key of different contour, the procedure is substantially as follows:

The lock is placed in a locked condition by its present key and the key is then withdrawn from the lock. The tool 46 of FIGS. 21, 22 and 23 is then inserted with its rods 35 extending in the passages 43 and 44 in the housing and into the grooves 30a and 31 with which said passages respectively communicate. The free ends of the rods 45 so inserted will come into contact with the lugs 34 and 35 on the pressure plate 33 and in order to flex the spring 27 and relieve most of its pressure on the buttresses 13, pressure is required on the head 47 of the tool and such pressure is obtained by the shoulders 54 of the prevailing key that has been inserted into the lock through the aperture 49 in the head of the tool. By reference to the diagrammatic disclosures of FIG. 13, further operation will become apparent. The prevailing key which is then projecting through the opening 49 of the tool 46 and extended into the plug 3 is now turned counter-clockwisely as viewed from the front of the lock, from the vertical center line C or point at which the key was inserted into the lock, as shown by the arrows A for the distance there designated, or approximately five degrees short of the transverse center line indicated at D. While the key is being so turned, its shoulders 54 ride on the inclined cam surfaces 48 of the tool 46 forcing the ends of the rods 45 against the lugs 34 and 35 of the pressure plate 33 which tends to relieve the pressure of the spring 27 on the buttresses 13.

Provided within the housing 1 on the inner wall surfaces thereof, are steps 65 and 66 constituting detents, the steps 66 being of greater height longitudinally of the housing, than those shown at 65. As the key is turned counter-clockwisely for the additional distance of substantially five degrees (or from line B to line D in FIG. 13) the lugs 34 and 35 will ride up on the higher steps 66 as shown in FIGS. 2 and 13, the latter figure showing the pressure plate 33 in dotted lines, thus holding the spring 27 in a substantially inverted and compressed condition and relieving the pressure of the spring 27 on the various buttresses so that they are then free to be shifted transversely in the housing to accommodate them and the tumblers to the contour of the new key to be used in the lock.

The present key, then in the lock, is now removed without turning it and the tool 46 is also withdrawn. Now a new key, of a contour different form from that of the original key, is inserted in the lock and turned clockwisely, and when this is done, the tumblers and buttresses, being free to shift in relation to one another, will adjust themselves to the contour of the new key. The new key thus turned clockwisely or returned to the vertical center line C as above stated, reaches the line C and the lug 37 on the pressure plate 33 is caused, by one end of the groove 9 in the plug, to move the plate 33 to an extent to cause the lugs 34 and 35 to leave the steps 66 so that the pressure of the spring 27 will then be returned and imposed on the buttresses, and the buttresses then will be clampingly maintained in their new positions of adjustment as required by the new key and the tumblers shifted to positions conforming to the contour of the new key.

It will thus be apparent that the change from one key to another is a simple operation, for stated briefly, it merely requires the insertion of a tool into the lock; the insertion of the prevailing key through the tool and into the lock; the turning of the prevailing key for about a quarter of a turn; then the removal of the prevailing key and the tool; the insertion of the new key and its turning clockwisely to vertical, central position. The new key is drawn out of the lock and the lock will thereafter respond to the latter key until changed by following the procedure above described.

While I have herein suggested that the adjustable buttresses shall be clampingly held together after being adjusted by the contact of the roughened or serrated surfaces 24 and 26 on the several buttresses, the modification shown in FIGS. 27 and 28 is also practicable. Therein, each of the buttresses 13 has one of its side edges 67 provided with a plurality of grooves 68. A rod 69 or similar member is insertable from either the front or rear of the lock through a suitable longitudinal passage therein, the rod engaging in the aligned grooves of several buttresses and holding them against shifting relatively to one another after they have been adjusted to suit a particular key. Thereafter the adjustment for a different key merely requires the withdrawal of the rod 69, permitting up or downward adjustment of the several buttresses according to the contour of the new key to be used.

Having thus described an embodiment of the invention, it is obvious that the same is not to be restricted thereto, but is broad enough to cover all structures coming within the scope of the annexed claims.

What I claim is:

1. In a lock, a housing, a rotatable latch-controlling plug mounted for rotative movement to advance or retract a latch, a plurality of wafer-type apertured tumblers movable through the plug, a buttress encircling each tumbler and slotted to receive parts of the same, the buttresses encircling the plug and being non-rotative but adjustable in a direction transversely of the plug, spring means for clamping the buttresses together and holding the same in adjusted positions while under the clamping pressure of the spring means, a first key insertable through the plug and engaging the tumblers to rotate the plug while the buttresses are maintained in a specific, clamped adjustment, means entrant into the lock and effective to relieve the pressure of the spring means to thereby lessen the clamping effect of the same upon the buttresses whereby the buttresses are then capable of adjustment, a second key entrant into the plug and to which the tumblers and buttresses then adapt themselves and permit rotative movement of the plug, and means effective upon manual turning of the second key for causing the spring means to apply its clamping pressure on the buttresses to thereby hold the same in the positions required to enable their tumblers to accommodate said second key.

2. A lock having a housing, a latch-actuated plug rotatable in said housing, tumblers passing through the plug, buttresses encircling the plug and provided with means engageable by the tumblers, the buttresses being non-rotative with respect to the housing and being adjustable transversely of the plug, serrated means on the edges of the abutments and holding means for engaging in said serrated means for holding the buttresses in position for the acceptance of a specific key by the tumblers to permit rotation of the plug, the holding means being shiftable for releasing said holding means to permit adjustment of the buttresses to positions for the acceptance of a different key, the holding means being effective to maintain the buttresses in the last-mentioned position.

3. A lock as provided for in claim 2, wherein the holding means consists of an elongated tool operative against the serrated edges of the buttresess and a detent for holding the buttresses in freed position to enable them to become arranged for the acceptance of a different key.

4. In a lock, a plurality of non-rotative buttresses adjustable to accommodate tumblers contained by them to match the contour of different keys, the buttresses being maintained in facial contact when in an adjusted position to enable their tumblers to accept a specific key, the buttresses having roughened surfaces in contact when in such adjusted position, and spring means at one end of a plurality of the buttresses for urging the buttresses together into facial contact to clamp the buttresses together, and means entrant into the lock for relieving the pressure of said spring means to thereby free the buttresses to permit the same to become adjusted for the accommodation of a different key when such different key is inserted in the lock.

5. In a lock as provided for in claim 4, wherein the means which relieves the pressure of the spring means consists of a pronged tool entrant into the lock to exert pressure against the spring means to thereby relieve its pressure on the buttresses, said tool being thereafter removable from the lock to permit the spring means to exert its pressure on the buttresses.

6. In a lock as provided for in claim 5, wherein the pronged tool is provided with cams against which parts of an inserted key are operative to apply pressure on the tool to cause its prongs to exert a pressure-relieving force on the spring means.

7. A lock comprising, a housing, a rotatable latch-actuating plug located within the housing, a plurality of cup-shaped buttresses surrounding the plug within the housing, wafer-type tumblers extending transversely through the housing, the buttresses having grooves for the reception of parts of the tumblers, the buttresses being non-rotative but being capable of relative adjustment in a direction transversely of the housing, spring means operative against the buttresses to clampingly hold the same in a position of adjustment in which the tumblers will accommodate a specific key to permit rotative movement of the plug, a tool having parts insertable in the casing to apply pressure on the spring means to relieve the pressure of said spring means on the buttresses and permit a different adjustment of the buttresses to be had, and detent means on the housing for holding the spring means in a non-clamping position with the spring means being so held until disengaged from said detent means by rotative movement of the plug by means of a different key inserted in it.

8. In a lock, a housing, a latch-controlling plug mounted for rotative movement in the housing, a plurality of buttresses encircling the plug and adjustable in a direction transversely of the housing, said buttresses having wafer-type tumblers movable through the plug, the buttresses having interengaging irregularities on opposing faces, spring means for pressing the buttresses together to maintain their irregularities in engagement to thereby hold the buttresses against movement relatively to one another after the same have been set to permit the acceptance of a specific key by their tumblers, and releasing means effective on the spring means to thereby relieve the pressure of said spring means on the buttresses whereby the buttresses become free to adapt themselves and their tumblers to the contour of a different key then inserted through the tumblers.

9. In a lock, a housing, a latch-controlling plug mounted for rotative movement in the housing, a plurality of buttresses encircling the plug and adjustable in a direction transversely of the housing, said buttresses having wafer-type apertured tumblers movable through the plug, the buttresses having a plurality of grooves in them, a removable pin passing through said grooves in several of the buttresses to thereby hold the buttresses against movement relatively to one another, the removal of said pin permitting the buttresses to become free to adapt themselves and their tumblers to the contour of a different key then inserted through the tumblers.

References Cited in the file of this patent

UNITED STATES PATENTS

| | | |
|---|---|---|
| 1,826,595 | Benham | Oct. 6, 1931 |
| 1,917,302 | Hill | July 11, 1933 |
| 2,453,066 | Gabrielsen | Nov. 2, 1948 |
| 2,524,696 | Ellis | Oct. 3, 1950 |
| 2,970,466 | Wellekens | Feb. 7, 1961 |

FOREIGN PATENTS

| | | |
|---|---|---|
| 692,736 | Great Britain | June 10, 1953 |